A. D. Smith,
Lock Nut,
N° 78,899.    Patented June 16, 1868.
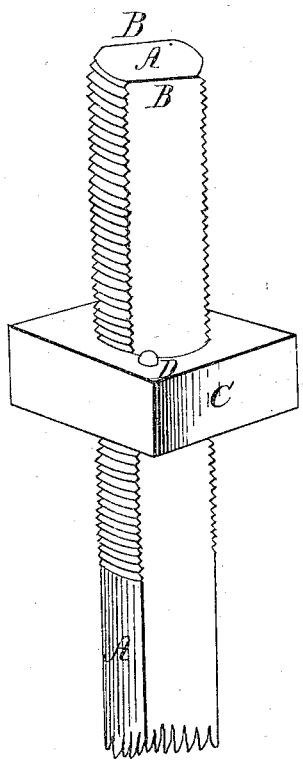
Witnesses
G. F. Beckham
L. L. McClintock
Inventor
A. D. Smith

United States Patent Office.

A. D. SMITH, OF GRAFTON, OHIO.

Letters Patent No. 78,899, dated June 16, 1868.

IMPROVEMENT IN LOCK-NUTS.

The Schedule referred to in these Letters Patent and making part of the same.

TO ALL WHOM IT MAY CONCERN:

Be it known that I, A. D. SMITH, of Grafton, county of Lorain, in the State of Ohio, have invented a new and improved Mode of Securing Nuts from Turning; and I do hereby declare that the following is a full and exact description thereof, reference being had to the accompanying drawings, and to the letters of reference marked thereon.

The nature of my improvement consists in setting in a small part of the inner diameter of the nut into the concave or flat sides of the screw, provided for that purpose, and thus securing the nut at any point, and retaining it there until removed by force.

The following is a description of its construction, arrangement, and operation.

I make the screw, A, with one or more of its sides, B B, a little concave or flat, and about once and a half the depth of the screw-thread into the diameter of the screw A. The nut C and screw A may then be screwed together, to any desired point, when a small part of the nut C, at its inner diameter, may be set in against the concave or flat sides B B of the screw A, as shown at D, and thus prevent either the screw A or nut C from becoming loose or separated from the other without extra force.

What I claim as my invention, and desire to secure by Letters Patent, is—

The mode herein shown and described of securing nuts from turning, substantially as and for the purpose set forth.

A. D. SMITH.

Witnesses:
   G. F. PECKHAM,
   L. L. McCLINTOCK.